US012639624B1

(12) United States Patent
Alvarez

(10) Patent No.: US 12,639,624 B1
(45) Date of Patent: May 26, 2026

(54) HEURISTIC OPERATIONAL NETWORK FOR DEEP LEARNING SEARCH AND MACHINE LEARNING MODEL SEARCH, DESIGN AND DEVELOPMENT

(71) Applicant: Citicorp Credit Services Inc. (USA), Jacksonville, FL (US)

(72) Inventor: Richard Alvarez, Montpelier, VA (US)

(73) Assignee: Citicorp Credit Services Inc. (USA), Jacksonville, FL (US)

( * ) Notice: Subject to any disclaimer, the term of this patent is extended or adjusted under 35 U.S.C. 154(b) by 1142 days.

(21) Appl. No.: 17/669,975

(22) Filed: Feb. 11, 2022

(51) Int. Cl.
*G06N 20/00* (2019.01)

(52) U.S. Cl.
CPC ......... *G06N 20/00* (2019.01); *G06F 2218/08* (2023.01)

(58) Field of Classification Search
CPC ............................ G06N 20/00; G06F 2218/08
See application file for complete search history.

(56) References Cited

U.S. PATENT DOCUMENTS

| | | | |
|---|---|---|---|
| 10,592,386 B2 | 3/2020 | Walters et al. | |
| 2016/0110657 A1 | 4/2016 | Gibiansky et al. | |
| 2016/0132787 A1 | 5/2016 | Drevo et al. | |
| 2018/0101529 A1 | 4/2018 | Karpistsenko et al. | |
| 2020/0050099 A1 | 2/2020 | Su et al. | |
| 2020/0118036 A1 | 4/2020 | Karnagel et al. | |
| 2020/0167694 A1 | 5/2020 | Pisner | |
| 2020/0202171 A1 | 6/2020 | Hughes et al. | |

| | | |
|---|---|---|
| 2020/0327357 A1 | 10/2020 | Karnagel et al. |
| 2020/0327448 A1 | 10/2020 | Yakovlev et al. |
| 2020/0334569 A1 | 10/2020 | Moghadam et al. |

(Continued)

FOREIGN PATENT DOCUMENTS

WO    WO-2020/242767    12/2020

OTHER PUBLICATIONS

Paullada et al., "Data and its (dis)contents: A survey of dataset development and use in machine learning research", Patterns, vol. 2, No. 11, Nov. 12, 2021, 42 pages.

(Continued)

*Primary Examiner* — Kamran Afshar
*Assistant Examiner* — Simon Fischer Ellis
(74) *Attorney, Agent, or Firm* — Foley & Lardner LLP

(57)    ABSTRACT

Computer-automated tools to assist machine learning model development may be suitable for users without domain expertise or specialized expertise in particular model types. An initial grid search via gradient boosting is applied to a source data set and target to generate a reduced search space including prioritized set of features ranked by importance value. A genetic algorithm searches the supervised learning classification problem space with various model choices and feature engineering. AI model training techniques may include machine learning test models, test hyperparameters, and network architectures. Feature engineering generates new features, and model development promotes features with fitness scores satisfying a defined threshold. Feature engineering may employ feature combinations, scaling, normalization, and feature convolutions. ML model development may apply a genetic operator including one or more of crossover, mutation, and selection. Iterative test ML model development generates pre-trained models that can yield code for deployment of production models.

21 Claims, 9 Drawing Sheets

(56)     References Cited

U.S. PATENT DOCUMENTS

| | | | |
|---|---|---|---|
| 2021/0097329 A1* | 4/2021 | Jia | G06N 3/08 |
| 2021/0201209 A1 | 7/2021 | Sghiouer | |
| 2022/0027792 A1 | 1/2022 | Cummings et al. | |
| 2022/0035878 A1 | 2/2022 | Sarah et al. | |
| 2022/0036194 A1 | 2/2022 | Sundaresan et al. | |
| 2022/0107744 A1* | 4/2022 | Capelo | G06N 20/00 |
| 2022/0164877 A1* | 5/2022 | Kamkar | G06F 18/24323 |
| 2022/0180512 A1* | 6/2022 | Oh | G06N 3/084 |
| 2022/0374766 A1* | 11/2022 | Thorsley | G06N 3/0495 |

OTHER PUBLICATIONS

Qiao et al., "Litz: Elastic Framework for High-Performance Distributed Machine Learning", 2018 USENIX Annual Technical Conference (USENIX ATC '18), Jul. 2018, pp. 631-643.
Xie et al., Weight-Sharing Neural Architecture Search: A Battle to Shrink the Optimization Gap, Aug. 5, 2020, 24 pages.
Zhang et al., "Deeper Insights Into Weight Sharing in Neural Architecture Search", Jan. 6, 2020, 16 pages.
Candle et al., "Deep Learning with H2O," Sixth Edition, Dec. 2020; 55 pages.
Li et al., "Geometry-Aware Gradient Algorithms for Neural Architecture Search", Mar. 18, 2021, 25 pages.
Mu Li et al., "Scaling Distributed Machine Learning with the Parameter Server", 11th USENIX Symposium on Operating Systems Design and Implementation (OSOi '14), Oct. 2014, pp. 583-598.

* cited by examiner

Figure 2:
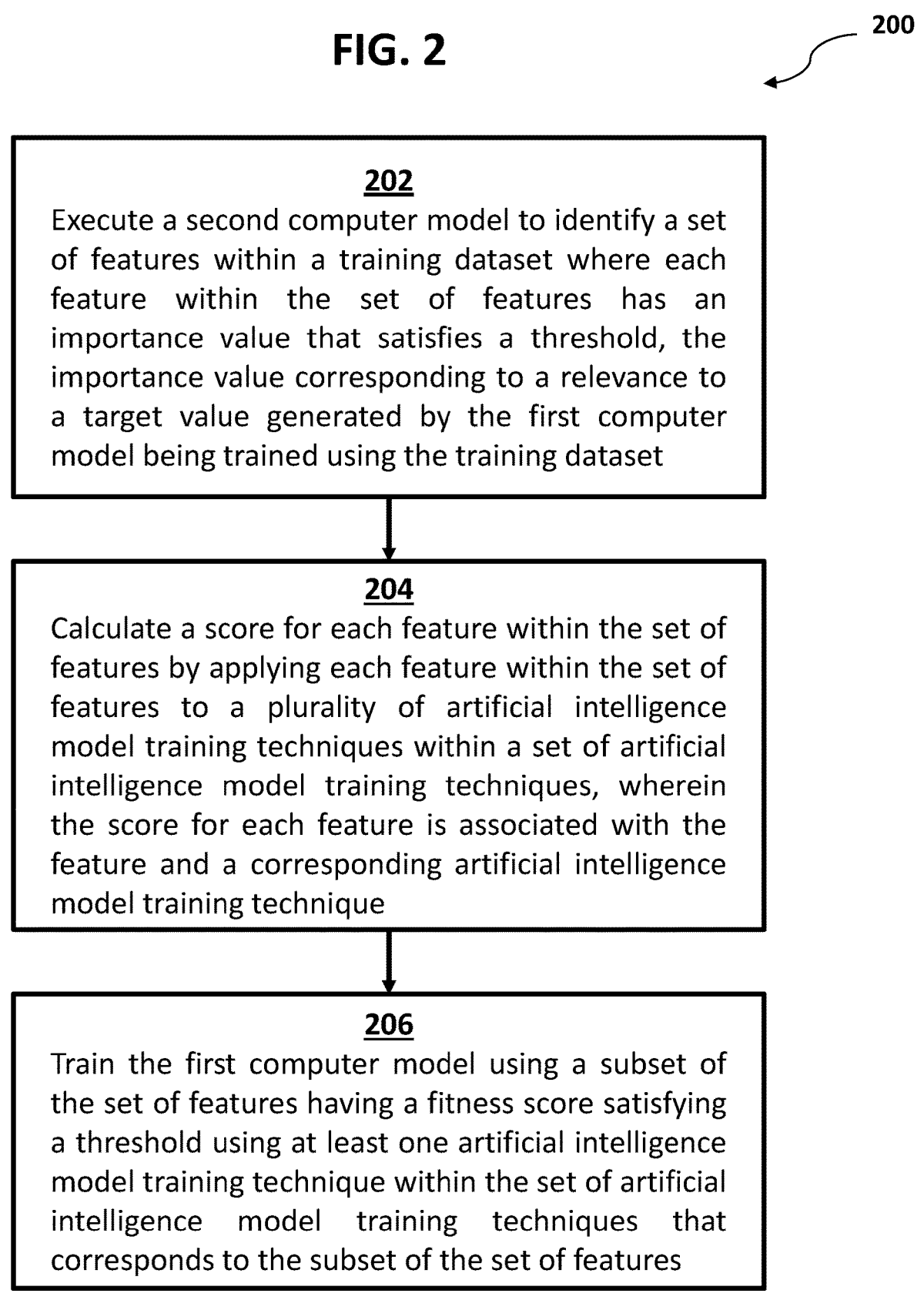

202
Execute a second computer model to identify a set of features within a training dataset where each feature within the set of features has an importance value that satisfies a threshold, the importance value corresponding to a relevance to a target value generated by the first computer model being trained using the training dataset

204
Calculate a score for each feature within the set of features by applying each feature within the set of features to a plurality of artificial intelligence model training techniques within a set of artificial intelligence model training techniques, wherein the score for each feature is associated with the feature and a corresponding artificial intelligence model training technique

206
Train the first computer model using a subset of the set of features having a fitness score satisfying a threshold using at least one artificial intelligence model training technique within the set of artificial intelligence model training techniques that corresponds to the subset of the set of features 420
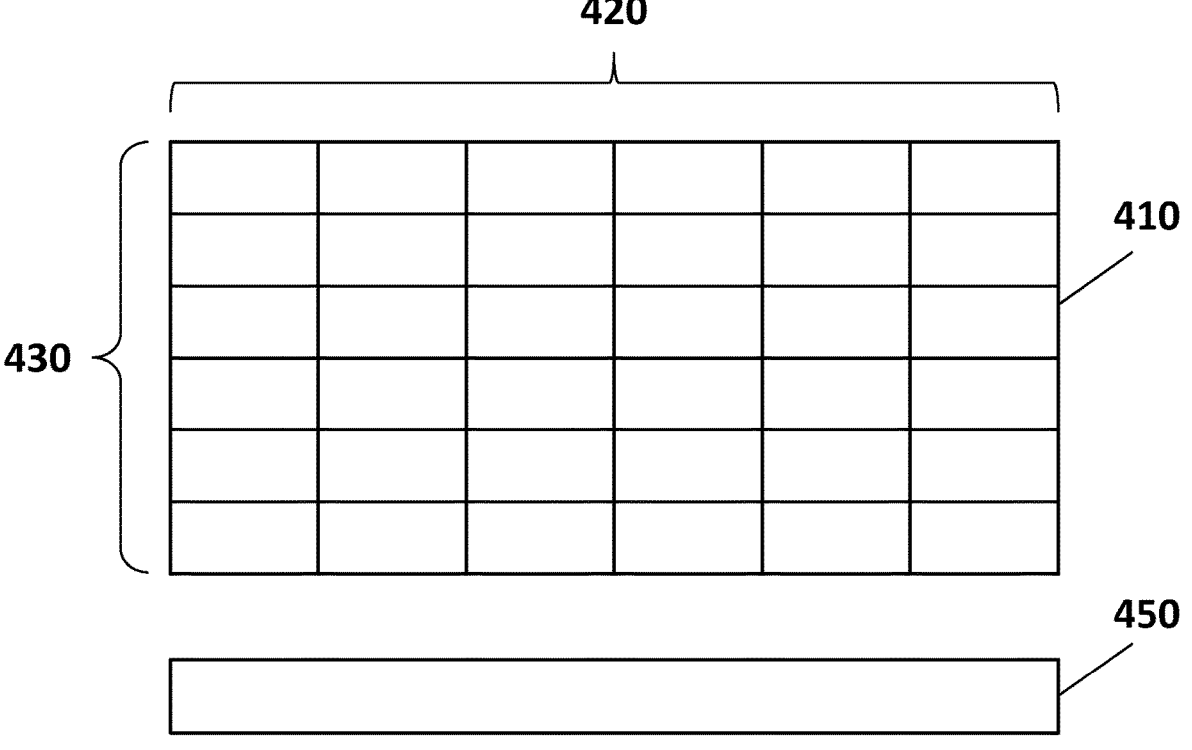
410
430
450
400
FIG. 4

HEURISTIC OPERATIONAL NETWORK FOR DEEP LEARNING SEARCH AND MACHINE LEARNING MODEL SEARCH, DESIGN AND DEVELOPMENT

TECHNICAL FIELD

The present disclosure relates generally to machine learning and, in particular, to automated development of machine learning models.

BACKGROUND

Machine learning is a process that gives computers the ability to learn, and machine learning algorithms may map input data to output data in order to train a machine learning model. One type of machine learning is supervised learning in which a model is trained with a data set including known output data for a sufficient number of input data. Once a model is trained, it may be deployed, e.g., applied to new input data to predict the expected output.

Traditional techniques for machine learning model development can call for domain expertise or knowledge and understanding of a particular field. Additionally, development and implementation of machine learning models traditionally requires strong data science skills, including specialized knowledge of particular classes of machine learning models. Conventional processes for developing model algorithms and for accessing and preparing data for training the model include techniques such as human data analysis, visualization, and imputation. Such techniques for model development typically depend upon professionals with specialized data science skills and domain expertise so that the model will give meaningful results.

SUMMARY

For the aforementioned reasons, there is a desire for system and method for machine learning (ML) model development suitable for users without domain expertise or specialized expertise in particular model types. Described herein are methods and systems that assist machine learning model development using automated tools. Disclosed embodiments enable discovery of new features and feature combinations without human intervention in iterative model development. Disclosed embodiments aim to reduce model complexity via minimized feature use and feature engineering. Search space reduction procedures may support optimized feature engineering. An exhaustive testing strategy may avoid human-based predispositions in model development.

In disclosed embodiments, computer-automated tools to assist machine learning model development may be suitable for users without domain expertise or specialized expertise in particular model types. An initial grid search via gradient boosting may be applied to a source data set and target to generate a reduced search space including prioritized set of features ranked by importance value. A genetic algorithm may search the supervised learning classification problem space with various model choices and feature engineering. Model test techniques may include test machine learning models, test hyperparameters, and test network architectures.

In various embodiments, feature engineering may generate new features. Feature engineering may employ feature combinations, scaling, normalization, and feature convolutions. ML model development may promote feature populations with fitness scores satisfying a defined threshold. ML model development may apply a genetic operator to promoted feature populations including one or more of crossover, mutation, and selection. Iterative development of machine learning models may yield pre-trained models, which may include code for deployment of production models. In an embodiment, the heuristic operational network generates materialized code for model development. The materialized code may be executed during iterative operation of the heuristic operational network from a command line using a limited codebase.

In an embodiment, a method of training a first model comprises executing, by a processor, a second computer model to identify a set of features within a training dataset where each feature within the set of features has an importance value that satisfies a threshold, the importance value corresponding to a relevance to a target value generated by the first computer model being trained using the training dataset; calculating, by the processor, a score for each feature within the set of features by applying each feature within the set of features to a plurality of artificial intelligence model training technique within a set of artificial intelligence model training techniques, wherein the score for each feature is associated with the feature and a corresponding artificial intelligence model training technique; and training, by the processor, the first computer model using a subset of the set of features having a fitness score satisfying a threshold using at least one artificial intelligence model training technique within the set of artificial intelligence model training techniques that corresponds to the subset of the set of features.

In another embodiment, a method comprises executing, by a processor, a first computer model to identify a set of features within a training dataset where each feature within the set of features has an importance value that satisfies a threshold, the importance value corresponding to a relevance to a target value generated by the first computer model being trained using the training dataset; calculating, by the processor, a score for each feature within the set of features by applying each feature within the set of features to a plurality of artificial intelligence model training techniques within a set of artificial intelligence model training techniques, wherein the score for each feature is associated with the feature and a corresponding artificial intelligence model training technique selected from a first set of machine learning models; training, by the processor, a second computer model using a subset of the set of features having a fitness score satisfying a threshold using at least one artificial intelligence model training technique within the set of artificial intelligence model training techniques selected from the first set of machine learning models that corresponds to the subset of the set of features; and training, by the processor, a third computer model using a set of features derived from the subset of the set of features having a fitness score satisfying a threshold using at least one artificial intelligence model training technique within a set of artificial intelligence model training techniques selected from a second set of machine learning models.

In a further embodiment, a system comprises an application server comprising a processor executing or hosting an automated machine learning model application, the processor configured to execute or host the automated machine learning model application to: execute a second computer model to identify a set of features within a training dataset where each feature within the set of features has an importance value that satisfies a threshold, the importance value corresponding to a relevance that a target value generated by the first computer model being trained using the training dataset; calculate a score for each feature within the set of features by applying each feature within the set of features to each artificial intelligence model training technique within a set of artificial intelligence model training techniques, wherein the score for each feature is associated with the feature and a corresponding artificial intelligence model training technique; and train a first computer model using a subset of the set of features having a fitness score satisfying a threshold using at least one artificial intelligence model training technique within the set of artificial intelligence model training techniques that corresponds to the subset of the set of features.

It is to be understood that both the foregoing general description and the following detailed description are exemplary and explanatory, and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

FIG. 2 illustrates a flowchart depicting operational steps for an automated machine learning model development method, in accordance with an embodiment.

FIG. 4 illustrates a source data set and target variable provided as input to a small-scale grid search, in accordance with an embodiment.

DETAILED DESCRIPTION

Figure 1:
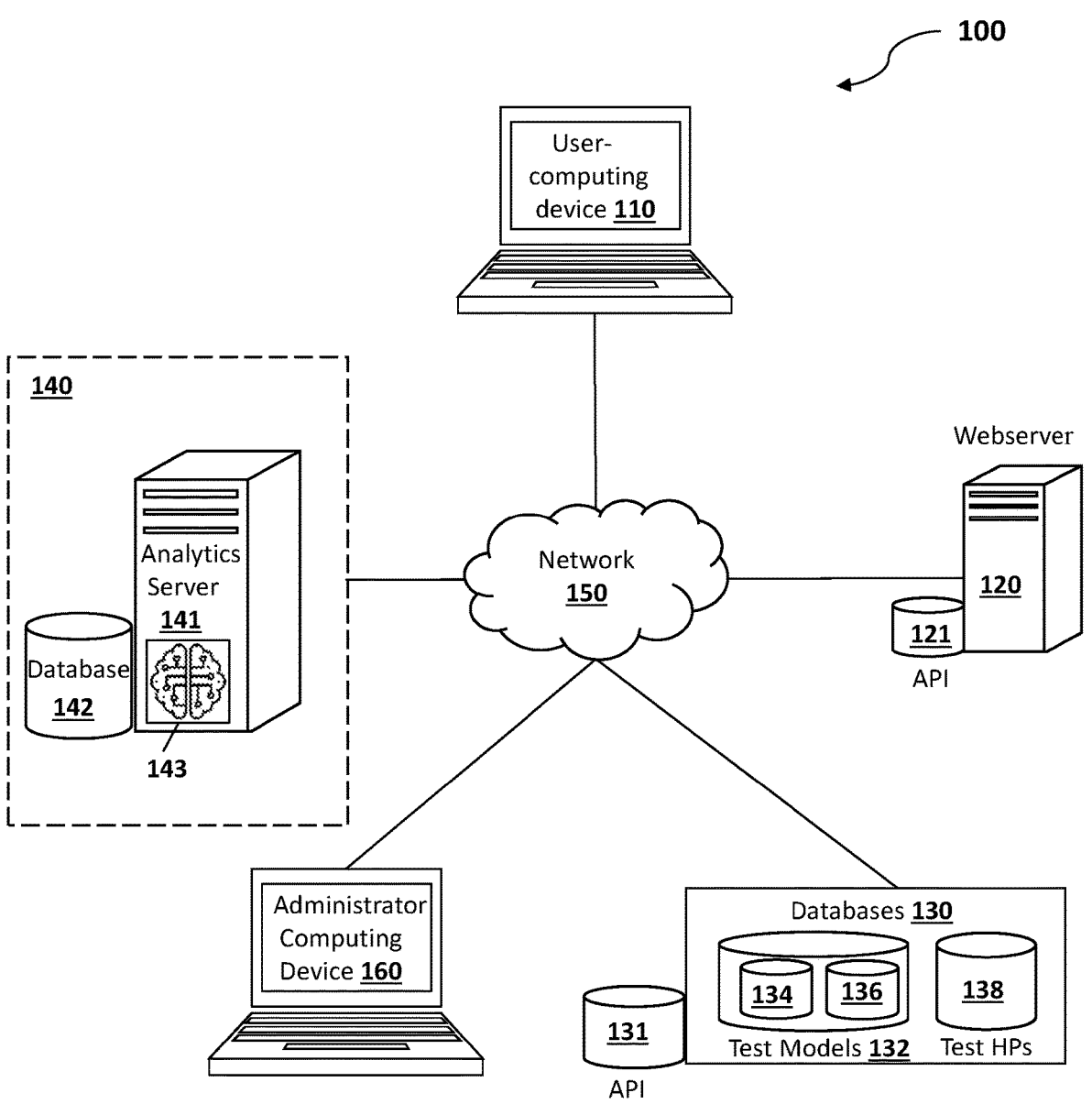
FIG. 1 illustrates a computer system for an automated machine learning model development framework, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

System and methods of the present disclosure may employ computer-automated tools to assist machine learning model development. The machine learning model may map input variables (also called "features") to a target (also called "target variable" or "output variables"). Traditional methods of model development incorporate supervised methods of feature selection to select a set of input variables or features that maximize a model's performance, e.g., based on determination of feature importance values. This approach to feature selection is model-dependent because different models consider feature importance under different points of view. A limitation of this approach is that choosing the model a priori can introduce bias in feature analysis. Disclosed embodiments may automatically generate before-the-fact variable importance determinations for subsequent model testing. Before-the-fact variable importance determinations, together with competitive model selection, may avoid human-based predispositions in automated machine learning model development.

Disclosed embodiments may apply a grid search via gradient boosting to generate a prioritized set of features from a source data set, ranked by importance value. Traditional machine learning techniques use grid search for hyperparameter tuning to determine best estimators (hyperparameters) as inputs to a machine learning model. Methods of the present disclosure may perform an initial gradient boosted machine grid search with data sampling data at a very limited scale to derive initial vectors identifying features to try in model development. Initial grid search feature selection may allow for search space reduction to reveal optimized feature engineering in model development.

Additionally, disclosed embodiments may apply time series resampling techniques to temporal data of a source data set to change the frequency of time series observations, and to provide additional structure or insight into machine learning for supervised learning methods.

In employing automated ML model development techniques, users may not need to be domain experts in fields such as fraud or OCR. This contrasts to traditional methods of model development that rely on human data analysis, visualization, and imputation for feature exploration and feature engineering. Additionally, users may not need to be experts in particular model types, such as gradient boosting models and neural network models.

In disclosed embodiments, a genetic algorithm may search the supervised learning classification problem space with various model choices and feature engineering. Feature engineering may employ n-type feature combinations, scaling, or normalization, as well as feature convolutions. These automated model development techniques can yield lift in pre-trained model accuracy, optimized hyperparameter tuning, and optimized architecture selection. Techniques of the disclosure can develop pre-trained models that can generate code for deployment of production models. In an embodiment, the heuristic operational network generates materialized code for model development. The materialized code may be executed during iterative operation of the heuristic operational network from a command line using a limited codebase.

FIG. 1 illustrates various components of a system 100 for an automated ML model development framework, in accordance with an embodiment. The system 100 provides a non-limiting example of a computer system having various components that can be utilized to analyze an input data set and execute an automated ML model development framework.

The system 100 may include an analytics server 141 and a database 142 (collectively automated ML development system 140), webserver 120, database 130, user-computing device 110, and administrator computing device 160. These components may communicate with each other over a network 150. The network 150 may include, but is not limited to, private or public local area networks, wireless local area networks, metropolitan area networks, wide-area networks, and the Internet. The network 150 may further include both wired and wireless communications according to one or more standards via one or more transport mediums. Communication over the network 150 is in accordance with various communication protocols such as transmission control protocol and internet protocol, user datagram protocol, and Institute of Electrical and Electronics Engineers communication protocols. The network 150 may further include wireless communications according to Bluetooth specification sets, or another standard or proprietary wireless communication protocol. The network 150 may further include communications over a cellular network, including, for example, a global system for mobile communications, code division multiple access, and enhanced data for global evolution network.

The system 100 may operate in a local computing environment where the user-computing device 110 executes an application to access an electronic platform generated/hosted by the webserver 120. An example of an electronic platform may be a website accessible through a browser application. For instance, the user-computing device 110 may execute a browser application and access a website hosted by the webserver 120. Even though some embodiments described herein focus on a website hosted by the webserver 120, the methods and systems described herein are not limited to websites. For instance, the webserver 120 may also host/generate an application accessible by the user-computing device 110 (e.g., internal application native to an organization where an employee operating the user-computing device 110 may access a mobile application accessed by the user-computing device 110). The analytics server 141 may identify automated ML development interface to be presented on the user-computing device 110.

The system 100 may operate in a cloud-computing environment where the user-computing device 110 may be cloud-optimized. The user-computing device 110 may execute the browser application and access data for automated ML development wherein the data is processed by the analytics server 141. In the cloud-computing environment, a web browser executing on the user-computing device 110 may interface with an application program associated with the analytics server 141, which is executed remotely via cloud-based technology.

The analytics server 141 may be any computing device capable of performing the actions described herein. For instance, the analytics server 141 may include a processing unit, and a non-transitory machine-readable storage medium. The processing unit may include a processor with a computer-readable medium, such as random access memory coupled to the processor. The analytics server 141 may be executing algorithms or computer-executable program instructions, which may be executed by a single processor or multiple processors in a distributed configuration. The analytics server 141 may be configured to interact with one or more software modules of a same or a different type operating within the system 100.

Non-limiting examples of the processor may include a microprocessor, a CPU (central processing unit), a graphic processing unit (GPU), an application specific integrated circuit, or a field programmable object array, among others. The analytics server 141 is capable of executing data-processing tasks, data-analysis tasks, and valuation tasks. Non-limiting examples of the analytics server 141 may include a desktop computer, a server computer, a laptop computer, a tablet computer, or the like. For ease of explanation, the FIG. 1 depicts a single server computing device functioning as the analytics server 141. However, some embodiments may include a plurality of server computing devices capable of performing various tasks described herein.

The analytics server 141 may utilize databases, such as the databases 142, 130, to store and/or retrieve various data described herein. For instance, the analytics server 141 may store data corresponding to different user attributes within a database 142. Each user attribute may correspond to an access authorization level indicating a data sensitivity level accessible by the user. For instance, a user may only have a level 1 access prohibiting them from viewing automated ML development. The analytics server 141 may then use the user attributes to regulate whether the user can access certain data associated with automated ML development.

The analytics server 141 and the databases 142, 130 may represent an automated ML development system 140. The automated ML development system 140 may offer dynamic revision of electronic content (e.g., webpages) for the webserver 120. In a non-limiting example, the webserver 120 may generate/host a website for a bank that is viewed by various employees. The analytics server 141 may utilize the methods and systems described herein to revise the webpage and display customized information accordingly by masking data based on the viewer's authorization level.

The analytics server 141 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of the system 100. Using different APIs, the analytics server 141 may automatically transmit and/or receive calls and instruction. For instance, the analytics server 141 may use the API 121 to communicate with the webserver 120, such that when a user operating the user-computing device 110 requests to view data, the API 121 automatically transmits a notification to the analytics server 141. The notification may include data needed for the analytics server 141 to identify whether the requested data includes restricted automated ML development data and whether the user operating the user-computing device 110 has proper authorization to view the data. The analytics server 141 may also use the API 131 to communicate with the database 130.

The API 131 and/or 121 may be two-way APIs. A two-way API refers to an API that allows information to be transmitted back and forth between at least two components of the system 100. For instance, when a user operating the user-computing device 110 requests to view data via a website hosted by the webserver 120, the API 121 may generate a call instructing the analytics server 141 to analyze the data and mask restricted automated ML development data (if any). The analytics server 141 may similarly use a two-way API 131 to communicate with the database 130.

Additionally or alternatively, the analytics server 141 may use a content delivery network (CDN) to ensure data integrity when communicating with different features described in the system 100. A CDN, as described herein, refers to a distributed delivery network of proxy servers/nodes that uses multi-layered delivery methods/systems to transmit data. The analytics server 141 may use a CDN when communicating various calls/instructions to the webserver 120 (directly or via the API 121) and/or the database 130 (directly or via the API 131).

The webserver 120 may be a computing device hosting a website (or any other electronic platform) accessible to the user-computing device 110 via the network 150. The webserver 120 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, a graphic processing unit (GPU), an application specific integrated circuit, or a field programmable object array, among others. Non-limiting examples of the processor may include a microprocessor, a CPU, a GPU, an application specific integrated circuit, or a field programmable object array, among others. While the system 100 includes a single webserver 120, in some embodiments, the webserver 120 may include a number of computing devices operating in a distributed computing environment.

The webserver 120 may execute algorithms or computer executable program instructions, which may be executed by a single processor or multiple processors in a distributed configuration. The webserver 120 may be configured to interact with one or more software modules of a same or a different type operating within the system 100. For instance, the webserver 120 may execute software applications configured to host an electronic platform, which may generate and serve various webpages to the user-computing device 110. The electronic platform may also embed various graphical user interfaces generated by the analytics server 141.

The webserver 120 may execute software applications configured to display the user interfaces described herein (e.g., host a website that displays graphical user interfaces and other graphical elements generated by the analytics server 141), which may generate and serve various webpages to the user-computing device 110. Even though the analytics server 141 and the webserver 120 are depicted as separate features, in some configurations, functionality of these features is performed by a single server.

The analytics server 141 and/or the webserver 120 may be configured to require user authentication based upon a set of user authorization credentials (e.g., usernames, passwords, biometrics, cryptographic certificates, and the like). In such implementations, the analytics server 141 and/or the webserver 120 may access a system database (e.g., database 130) configured to store user credentials, which the analytics server 141 and/or the webserver 120 may be configured to reference in order to determine whether a set of entered credentials (purportedly authenticating the user) match an appropriate set of credentials that identify and authenticate the user.

The analytics server 141 and/or the webserver 120 may generate and host webpages onto the user-computing device 110 based upon a user's role within the system 100. Using the authorization credentials, the analytics server 141 and/or the webserver 120 may access a user profile and determine whether the user is authorized to access automated ML development data stored in the database 130. In such implementations, the user's role may be defined by data fields and input fields in user records stored in the database 130. The analytics server 141 and/or the webserver 120 may authenticate the user and may identify the user's role by executing an access directory protocol (e.g., Lightweight Directory Access Protocol (LDAP)). As a result, the electronic content displayed on the user-computing device 110 may be customized for each user.

The user-computing device 110 may be any computing device that includes a processing unit. The processing unit may execute a web browser application that accesses or receives data records from the database 130 via the analytics server 141 and/or the webserver 120. The processing unit may include a processor with computer-readable medium, such as random access memory coupled to the processor. The user-computing device 110 may be running algorithms or computer executable program instructions, which may be executed by a single processor or multiple processors in a distributed configuration. An end-user (requesting to view data that may include automated ML development) may operate the user-computing device 110. For ease of explanation, FIG. 1 illustrates a single computing device functioning as the user-computing device 110. However, some embodiments may include a plurality of computing devices capable of performing the tasks described herein.

Databases 130 associated with the analytics server 141, the webserver 120, and the user-computing device 110 are capable of storing information in various formats and/or using encryption methods. Databases 130 include a database 132 of test machine learning test models. In an embodiment, analytics server 141 generates different machine learning models stored in test model database 132 in model test permutations during automated ML development. Test model database 132 may store multiple collections 134, 136 of ML models, wherein automated ML model development selects one of these collections for generating model test permutations. In an embodiment, the analytics server 140 may deploy a first, relatively comprehensive collection 134 of test ML models in an exploratory stage of iterative ML model development. The analytics server 140 may deploy a second, simplified collection 136 of ML models in a subsequent stage of iterative ML model development such as a final stage of model development.

Databases 130 also include a test HPs database 138 that stores test hyperparameters. In an embodiment, analytics server 141 generates different hyperparameters in model test permutations during automated ML development. In an embodiment, analytics server 141 may execute hyperparameter engineering in automatic generation of new hyperparameters during iterative model development. In an embodiment, databases 130 also may store test network architectures, and analytics server 141 may generate different test network architectures in model test permutations during automated ML development.

Databases 130 may store data records associated with various organizations utilizing the webserver 120, and data records associated with various users. Databases 130 may store data sets, e.g., data sets associated with specific subject matters or fields, which may be employed in automated ML model development. In an embodiment, to initiate automated ML model development, a user may transmit a source data set from databases 130 to analytics server 141 to perform an initial grid search. In an embodiment, a gradient boosting grid search identifies a prioritized list of highest importance features. In an embodiment, the grid search comprises a small-scale grid search that derives a substantially reduced feature space from the source data set.

Databases 130 also may store data associated with user preferences, attributes associated with various graphical elements to be generated by the analytics server 141, and the like. The database 130 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the databases 130 are shown as a separate computing feature, the databases 130 may be a part of a computing environment that includes the webserver 120 and/or the analytics server 141. In operation, the user-computing device 110 may utilize a web browser to generate a request to view data stored within the databases 130.

In a non-limiting example, the analytics server 141 may provide a pluggable software component to be installed and executed by a host utilizing the webserver 120 to host a website. Upon installation, a system administrator may configure the pluggable component using various preferences and defined criteria. For instance, the system administrator may customize the pluggable component, by inputting access rights for different users or providing masking preferences (e.g., visual attributes of automated ML development when presenting electronic content). A pluggable component (also known as a "plug-in") may be a software component that adds a specific feature to an existing computer program utilized and executed by the webserver 120. The analytics server 141 may provide services discussed herein via the pluggable component. The analytics server 141 may implement plug-in functionality using shared libraries that are dynamically loaded at run time and installed in a place prescribed by the host application (e.g., stored within the database 142 and/or database 130). The pluggable component may be in direct communication with the analytics server 141, such that the analytics server 141 can determine whether the user/customer has requested to view any data included in automated ML development.

The system 100 may be utilized by a third-party webserver (e.g., webserver 120) to execute automated ML development and revise one or more graphical elements generated during automated ML development. In some configurations, the graphical elements generated by the analytics server 141 may be incorporated into one or more webpages hosted by the webserver 120. In other configurations, the graphical elements generated by the analytics server 141 may be directly displayed onto the end-users' computing devices (e.g., user-computing device 110).

FIG. 2 shows execution steps of a computer-implemented machine learning model development method for training a first computer model. The illustrative method 200 shown in FIG. 2 comprises execution steps 202, 204, and 206. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

At step 202, the server may execute a second computer model to identify a set of features within a training dataset where each feature within the set of features has an importance value that satisfies a threshold. The importance value corresponds to a relevance to a target value generated by the first computer model being trained using the training dataset.

The second computer model may use a gradient boosting protocol to perform a grid search. The grid search may act upon a user-supplied data set and target. The grid search may generate a list of feature prioritized by highest importance values, and/or generates a code based on the prioritized list of features. The grid search may sample data in a very limited scale feature space relative to a feature space of the input data set.

At step 204, the server may calculate a score for each feature within the set of features by applying each feature within the set of features to a plurality of artificial intelligence model training techniques within a set of artificial intelligence model training techniques. The score for each feature may be associated with the feature and a corresponding artificial intelligence model training technique.

The server may generate a new feature, wherein the new feature has a fitness score that satisfies a defined threshold or the fitness threshold. The new feature comprises one or more of: combination of at least two features within the set of features; convolution of at least two features within the set of features; or a scaled transformation of at least one feature within the set of features. Multiple scalers may be combined in a given pipeline. In cases of convolution of at least two features, feature transformation may apply feature scaling before or after generating convolutions.

The sequence of feature transformation operations can affect feature ordering and results of feature transformations. During iterative model development, one generation of model development may include (or exclude) a given feature transformation, and the succeeding generation of model development may exclude (or include) the given feature transformation.

The server may generate a new feature, wherein the new feature has a fitness score that satisfies a defined threshold or the fitness threshold. The new feature may comprise one or more of a combination of at least two features within the set of features, a convolution of at least two features within the set of features, or a scaled transformation of at least one feature within the set of features.

The set of artificial intelligence model training techniques may include at least one of a neural network model, a support vector machines model, a gradient boosted decision tree model, a long short-term memory model, or a random forest machine learning model. The set of artificial intelligence model training techniques may include different hyperparameters.

At step 206, the server may train the first computer model using a subset of the set of features having a fitness score satisfying a threshold using at least one artificial intelligence model training technique within the set of artificial intelligence model training techniques that corresponds to the subset of the set of features. In an iterative training embodiment of step 206, the server may train a first computer model using a subset of the set of features having a fitness score satisfying a threshold using at least one artificial intelligence model training technique within the set of artificial intelligence model training techniques selected from the first set of machine learning models that corresponds to the subset of the set of features. The server then may train a third computer model using a set of features derived from the subset of the set of features having a fitness score satisfying a threshold using at least one artificial intelligence model training technique within a set of artificial intelligence model training techniques selected from a second set of machine learning models. The second set of machine learning models may comprise a subset of the first set of machine learning models.

Figure 3:
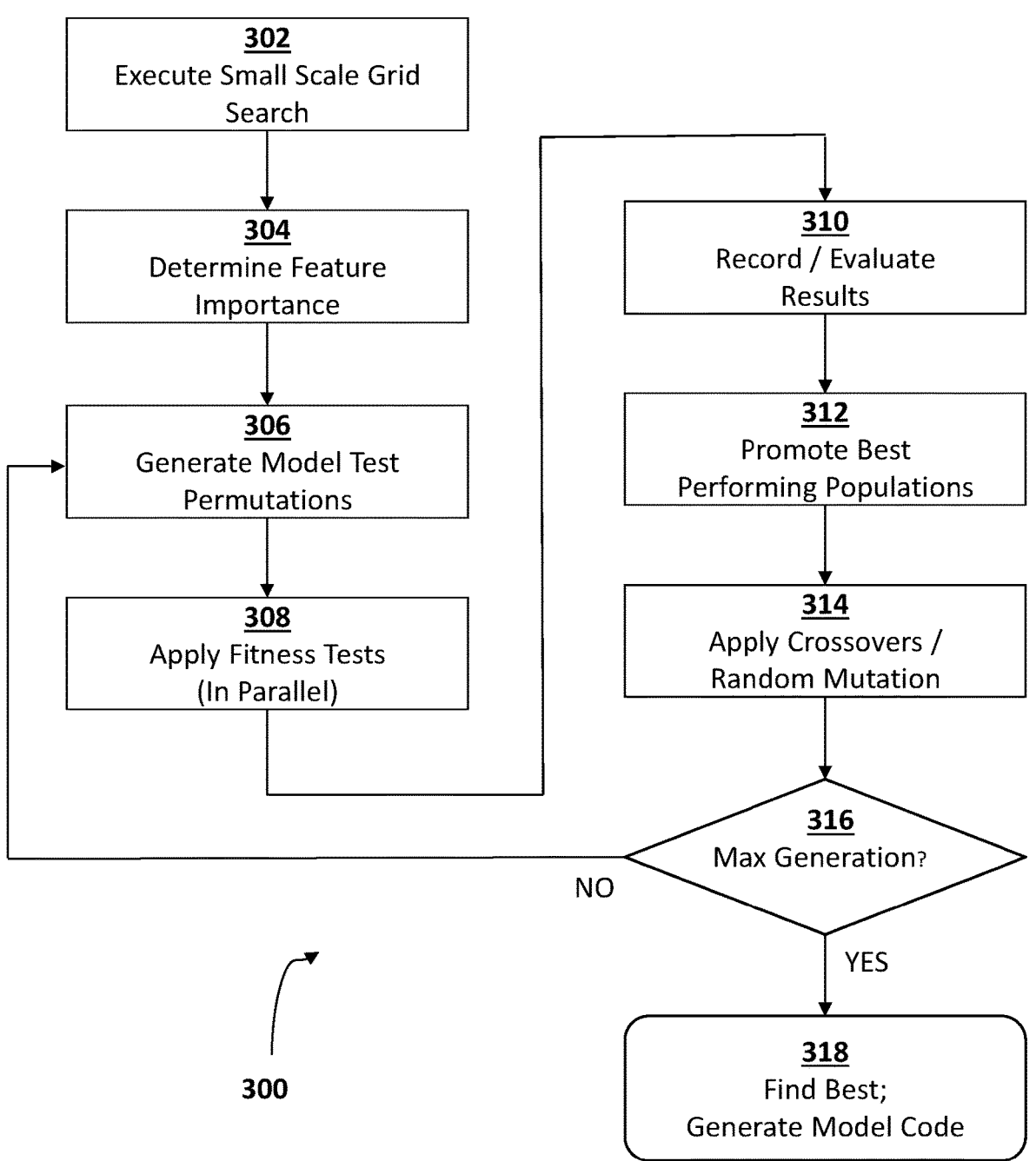
FIG. 3 illustrates a flowchart depicting operational steps for an automated machine learning model development method, in accordance with an embodiment.

FIG. 3 shows execution steps of a computer-implemented machine learning model development method. The illustrative method 300 shown in FIG. 3 comprises execution steps 302, 304, 306, 308, 310, 312, 314, 316, and 318. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

At step 302, upon receiving a source data set and a target variable, the server may execute a small-scale grid search on the source data set. In an embodiment, the grid search includes a gradient boosting grid search that generates a prioritized set of features from a source data set, ranked by importance value. In an embodiment, importance provides a score that indicates the value of each feature in the construction of boosted decision trees within the gradient boosting model. In various embodiments, the initial grid search generates a list of feature prioritized by highest importance values and/or generates a code based on the prioritized list of features.

The small-scale grid search may be performed on a source data set and target variable provided by a user, as shown at 400 in FIG. 4. Data set 410 comprises a grid in which columns 420 represent input variables or features in which each column represents a category of information of the data set. Each row 430 represents an instance of the data set. The target 450 represents the variable that the user seeks to predict. Typically the target variable does not correspond to a particular column 420 of the data set. In an embodiment, step 302 performs a gradient boosted machine grid search that samples data to derive initial vectors of highest performance features. The more a feature is used to make key decisions in predicting the target variable 450, the higher its relative importance.

The grid search may sample data defining a very limited scale feature space relative to the feature space of the input data set 410. In an embodiment, the grid search executes down-sampling to randomly select data points from the data set 410 and delete them. The grid search may employ random sampling from the rows 430 of the input data set for each tree. The grid search may employ randomly sampling of features 420 before each split.

The grid search may apply data transformations to the input data set 410 for down-sampling data. Down-sampling reduces the sampling rate, or resolution, of data. Down-sampling reduces dimensionality of the features 420 while losing some information, and reduces computation time in processing the transformed data. In comparison, up-sampling increases the sampling rate of already sampled data.

In addition to executing a small scale grid search 302 of the source data set 410 to determine feature importance, disclosed embodiments may apply other data transformation techniques appropriate to data types of features 420 of the input data set 410. In an embodiment, resampling methods are applied to time series data of the source data set. A time series is a series of data points indexed or plotted in time order. A time series may be a sequence taken at successive equally spaced points in time, e.g., a sequence of discrete-time data. Resampling refers to changing the frequency of time series observations, and includes upsampling and downsampling. For time series data, upsampling refers to increasing the date-time frequency of the sample, and down-sampling refers to decreasing the date-time frequency of the sample. One reason for resampling is that temporal data may not available at the same data-time frequency to be used to make predictions. For example, in applying a resample function including downsampling, time series data with relatively short time frequencies such as intervals of seconds or minutes may be aggregated over longer data-time frequencies such as hours or days, so that resampled data does not need interpolation. Another reason for resampling is for feature engineering. Resampling can be used to provide additional structure or insight into machine learning for supervised learning methods. In applying resampling in iterative model development, data transformations and windowing may be searched and retained, then communicated to subsequent model development using binary language of materialized code during a re-seed.

At step 304, the method 300 may determine feature importance. In an embodiment, step 302 outputs a prioritized list of highest importance features as a code. In various embodiments, automated ML model development applies this prioritized list or code to initiate a seed of testing.

Figure 5:
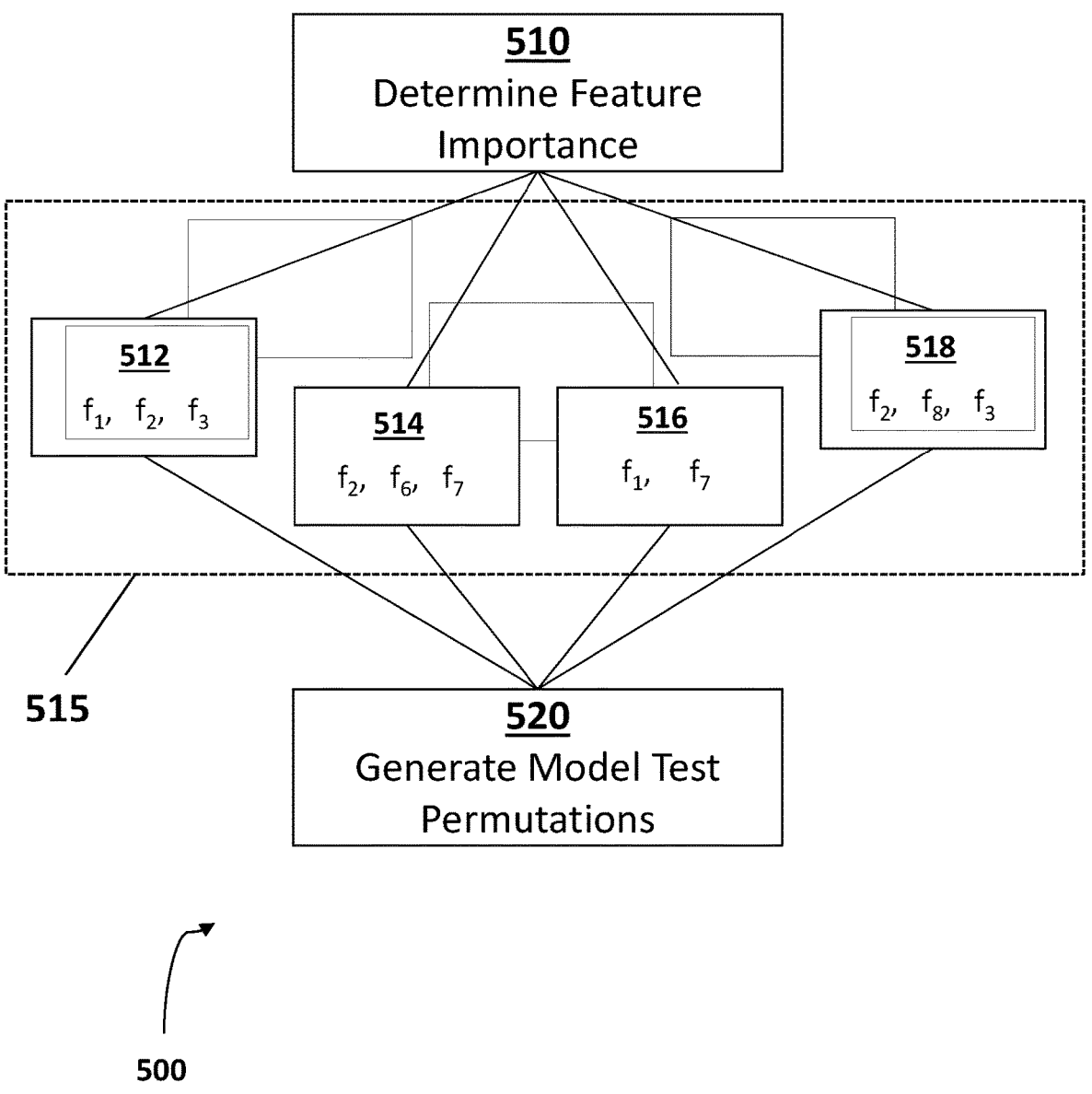
FIG. 5 illustrates a seed population of features including n-type feature combinations representing various permutations of features, in accordance with an embodiment.

The server may generate a seed population of features to initiate a seed of testing based upon a set of highest importance features. As shown in the diagram of FIG. 5, seed population 515 includes n-type feature combinations representing various permutations of features. This seed population is also referred to herein as a feature combination list. Feature combinations shown include combination 512 ($f_1$, $f_2$, $f_3$), combination 514 ($f_2$, $f_6$, $f_7$), combination 516 ($f_1$, $f_7$), and combination 518 ($f_2$, $f_8$, $f_3$). These feature combinations are not random as they are based on seeding the testing of permutations with the initial limited-scope grid search 302 that indicates higher likelihood of feature importance. By starting the combinatorial process only after the initial feature selection step, the method 300 dramatically limits time and computer resources needed. Small-scale grid search feature selection employs search space reduction to efficiently reveal a seed population or feature combination list 515 for optimized feature engineering at step 520, corresponding to step 306 of method 300.

At step 306, the server may generate model test permutations based upon the feature combination list 515 from step 304. Model test permutations may comprise different test machine learning models together with various populations of features for each test ML model. For example, an artificial neural network (ANN) model can take in feature combination ($f_1$, $f_7$) as well as feature combination ($f_2$, $f_8$, $f_3$). Model test permutations may include different test hyperparameters to control machine learning for given ML models. Additionally, model test permutations may include different test network architectures. Different network architectures, such as different neural network architecture types, may have a major impact on network performance in executing test ML models.

Figure 6:
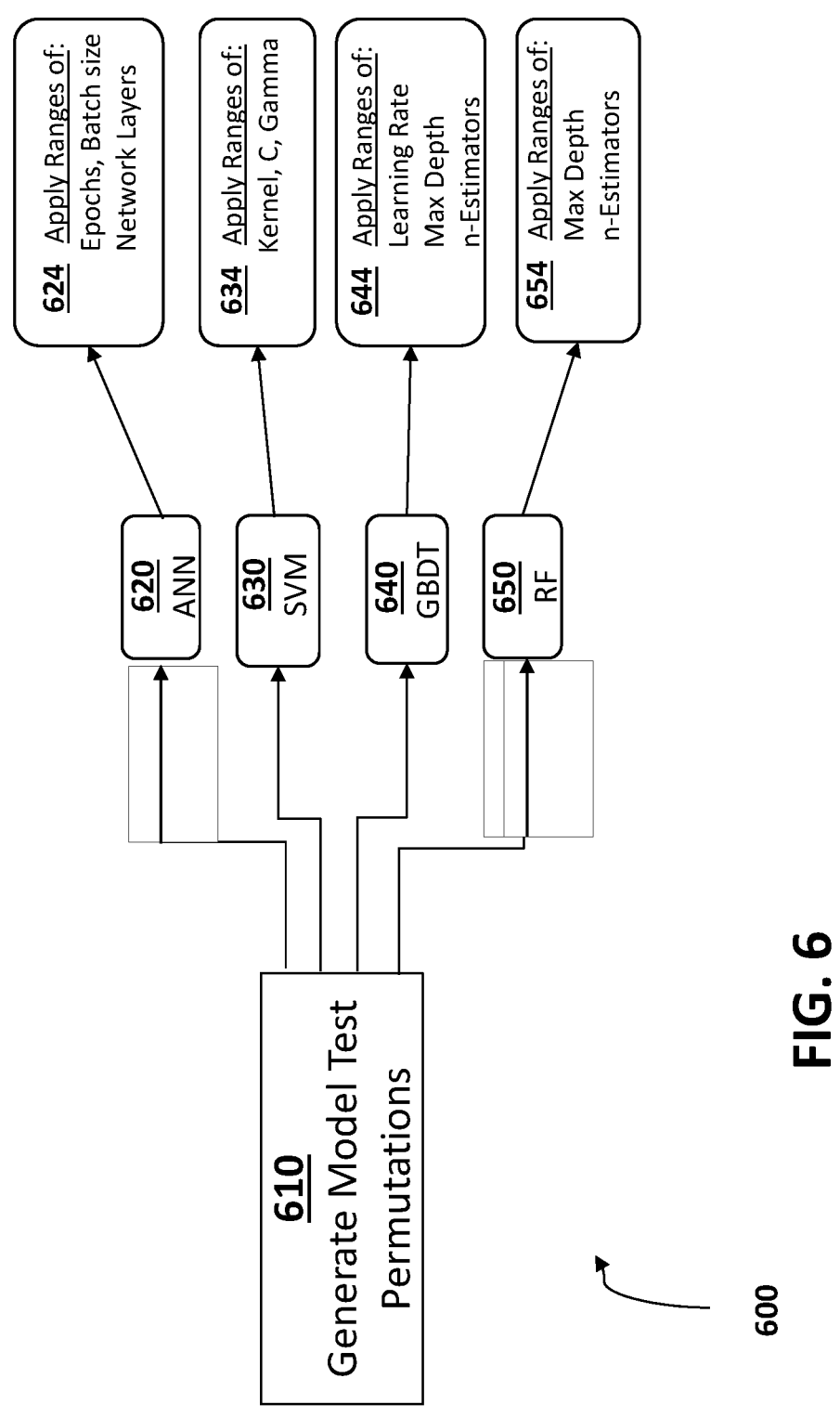
FIG. 6 shows a schematic diagram of a procedure for generating model test permutations, in accordance with an embodiment.

FIG. 6 is a schematic diagram of a procedure 600 for generating model test permutations. The system may generate model test permutations 610, e.g., generate a set of different machine learning models 620, 630, 640, and 650, each of which can be applied to various populations of features (not shown in FIG. 6). The system may deploy a variety of machine learning models in competitive model selection of test ML models, e.g.: xgb reg:linear; multi: softmax; binary:logistic; svm:rbf; svm:poly; svm:linear; svm:sigmoid; keras classifier; MLP classifier; lstm; rnn:gru; rnn:simple; rnn:embedding; and random forest classifier.

In the illustrated test ML models, machine learning model 620 is an ANN. In an embodiment, in generating model test permutations ANNs 620 may employ implementations from the Keras open-source software library originally authored by Francois Chollet. Keras provides implementations of neural-network features such as layers, objectives, activation functions, optimizers, and tools to facilitate working with image and text data in writing deep neural network code. In an example of different network architectures, Keras classifier network architectures may be characterized by varying ranges of neurons, sequences, embedded layer sizes, and other parameters.

In another example of different network architectures, ANNs 620 may embody a multilayer perceptron (MLP) class of feedforward ANN. An MLP consists of at least three layers of nodes: an input layer, a hidden layer and an output layer. MLPs may be characterized by number of hidden layers; use with solvers (e.g., stochastic gradient descent "SGD;" Adam optimization); varying sizes and depths (e.g., small, large, very large, etc.); and other parameters.

Machine learning model 630 may be a support-vector machine (SVM). SVMs are supervised learning models with associated learning algorithms that analyze data for classification and regression analysis. SVM is a non-probabilistic binary linear classifier, which maps training examples to points in space in order to maximize width of the gap between the two categories. In addition to performing linear classification, SVMs can efficiently perform a non-linear classification. In an embodiment, in generating model test permutations SVM 630 may incorporate a CPU working together with a GPU to increase the throughput of data and the number of concurrent calculations.

Machine learning model 640 may be a gradient boosting decision tree (GBDT) model. GBDT aggregates a collection of single weak learners (decision trees). GBDT algorithm is sometimes called gradient-boosted trees. In an embodiment, GBDT 640 is applied to linear regression in generating model test permutations. In an embodiment, GBDT 640 is applied to binary logistic regression in generating model test permutations. In an embodiment, GBDT 640 applies the softmax activation function to multiclass classification in generating model test permutations. Softmax applies the standard exponential function to each element of an input vector and normalizes these values by dividing by the sum of all these exponentials. In an embodiment, in generating model test permutations GBDT 640 may incorporate a CPU working together with a GPU to increase the throughput of data and the number of concurrent calculations.

Machine learning model 650 may be a random forest (RF) model. Random forests are an ensemble learning method for classification, regression and other tasks that operates by constructing a multitude of decision trees at training time. For classification tasks, generally the output of the random forest is the class selected by most trees. For regression tasks, generally the mean or average prediction of the individual trees is returned.

Additionally, the system may generate sets of different hyperparameters 624, 634, 644, and 654 to be carried out by respective ML models during model training. In generating model test permutations one or more hyperparameters within a hyperparameter set is selected to apply to a given ML model. One example of hyperparameter pertains to model architecture, such as number of layers and number of nodes in each hidden layer in ANN models 620. In another example, hyperparameters 644 for GBDT models 640 may include a learning rate of 5%, which would correlate to how quickly GBDT model changes as it goes through boosting iterations to try to minimize loss. In a further example, hyperparameters 654 for RF models 650 include max depth, which specifies a maximum depth of each tree. For example, a max depth 2 level deep may signify a decision tree model with many trees but a shallow decision tree structure.

In the illustrated embodiment, in generating model test permutations, different hyperparameters 624 for ANN 620 apply ranges of epochs, batch size, and network layers. In generating model test permutations, different hyperparameters 634 for SVM 630 apply ranges of kernel, C, and gamma. In generating model test permutations, different hyperparameters 644 for GBDT 640 apply ranges of learning rate, max depth, and n-Estimators. In generating model test permutations, different hyperparameters 654 for RF 650 apply ranges of max depth and n-Estimators.

Traditional model development relies on expertise of model developers in given model types and the hyperparameters that are appropriate to that model type. In the present system, a collection 132 of different test ML model types and a collection 138 of different hyperparameters appropriate for given model types may be built into system databases 130. Stored data 132, 138 can include data on how ML models and parameters work in a particular processing environment (e.g., large GPU). Stored data for hyperparameters 138 can include optimized settings of a particular modeling technique, such as hyperparameter tuning for a gradient boosting, random forests, or neural network model.

In applying different machine learning models trained by different hyperparameters to various populations of features, the step 306 of generating model test permutations also includes feature engineering of the populations of features. Feature engineering includes permutations and combinations of features. Feature engineering also includes feature scaling and normalization of features. Additionally, feature engineering can include feature convolutions.

Feature scaling normalizes the range of numeric features or independent variables, resulting in normalized values. Scaling techniques include min-max scaling or min-max normalization, which rescales the range of features to a normalized range, typically $[0, 1]$ or $[-1, 1]$. Mean normalization calculates and subtracts the mean for every feature. In different variations, mean normalization divides this calculation by the range of values or by the standard deviation. Z-score normalization, also called feature standardization, transforms the values of each feature to have zero-mean (when subtracting the mean in the numerator) and unit-variant.

Normalization converts source data into another format for effective processing. One type of normalization transforms features to be suitable for a particular type of ML model selected during model test permutations. For example, for application of a logistic regression ML test model, features that have lookup fields may be converted to integers, and continuous features may be converted to integers, with null values left null.

Feature engineering may introduce a convolution $f_2 \cdot f_3$. The convolution may express how the shape of one feature is modified by the other feature.

Feature engineering during model test permutations 306 can employ various feature transformations together. For example, in generating a combination of features $(f_2, f_8, f_3)$, the identification of $f_3$ may trigger a scaling transformation. That scaling would affect interpretation of the related variables $f_2$, $f_8$ against the target. For example, normalizing against a given range, such as $-1$ to $1$, would affect other features that are provided.

Feature engineering during step 306 results in generation of new features. These new features can be retained or discarded. If the new feature, e.g., scaling of $f_3$, performs well at the step 308 of model fitness testing, the new feature would be retained along with scaled interpretation of related variables $f_2$, $f_8$.

At step 308, automated model development may test fitness or performance of model test permutations generated during step 306. For example, evaluation of model performance can assess the effect of a test feature transformation at step 306 on model performance. Model fitness testing measures model accuracy. Fitness tests 308 define a performance threshold that should be met so that the best models will survive the fitness test. This threshold may increase over time during iterative model development.

In an embodiment, multiple instances of model training and performance testing in steps 306, 308 are executed concurrently in multi-threaded operation. Model fitness testing may incorporate container threads, which may include multiple containers for CPU and GPU processors.

At step 310, the process may evaluate and record fitness test results. At step 312, the process promotes best performing populations. Best performing populations include best performing ML models, parameters, and networks as applied to feature populations. Test models and features that do not meet fitness tests are discarded. At these steps, results are captured, recorded, and promoted forward if they perform well. The process may define a tolerance level so that fitness testing does not eliminate all but the best results. The process will keep results within this range.

Step 314 may apply principles of genetic algorithms to populations of features and feature combinations promoted at step 312. In an embodiment, step 314 applies three main genetic operators: crossover, mutation, and selection. Crossover swaps parts of the features population with another in feature combinations. Crossover can provide mixing of the features and convergence in a subspace. Mutation randomly changes part of an individual instance within a features population. Mutation can increase the diversity of the features population. Selection selects features population instances with high fitness to pass on to next generations. Fitness tests may be carried out by testing for maximum accuracy in ML model performance.

Figure 7:
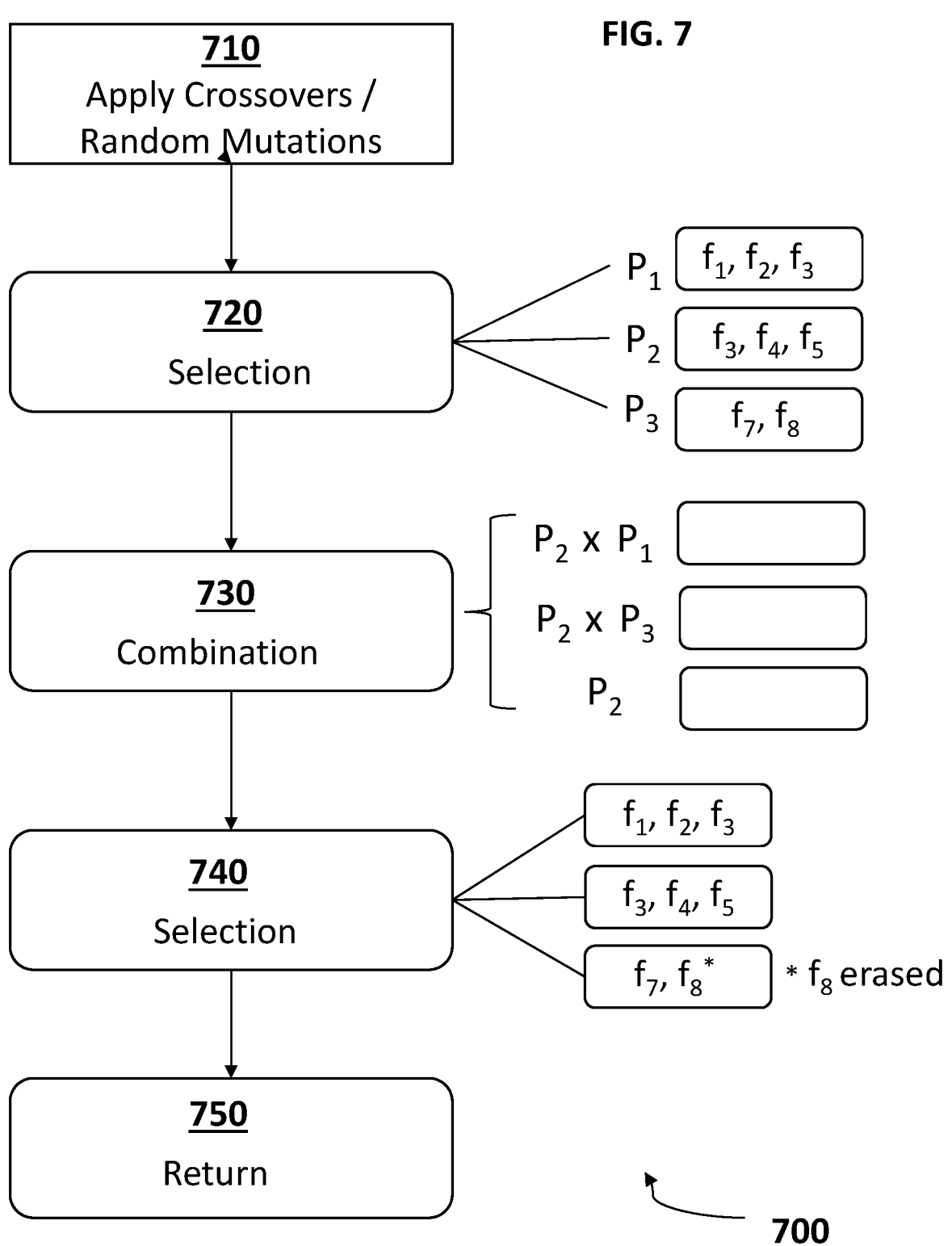
FIG. 7 illustrates a process for applying genetic operators to populations of promoted features, in accordance with an embodiment.

FIG. 7 shows sub-processes of step 710, apply crossovers/random mutation, representing an example of step 314 in FIG. 3. Selection step 720 selects among feature population instances $P_1$, $P_2$, and $P_3$. Combination step 730 generates combinations of population instances $P_2 \times P_1$, $P_2 \times P_3$, and $P_2$. Selection step 740 erases a population instance with feature $f_8$ that has failed a fitness test.

Genetic algorithms 314 can cross-over, recombine, or otherwise modify, best performing populations of features to generate new populations. Automated model development 300 seeds the genetic operators with generation and evaluation of new features. These new features can generate population combinations that will remain after further model performance testing at step 316.

At step 316, the process finds the best performing population and determines whether the ML model satisfies a performance threshold to accept the model. If the best performing ML model meets the threshold, the process terminates at 316 and generates code for the best-performing model. If the best performing ML model fails to meet the threshold, the process feeds back the results to continue model development at step 306.

In an embodiment, at step 316 the heuristic operational network generates materialized code for model development. The materialized code may be executed during iterative operation of the heuristic operational network from a command line using a limited codebase. For example, codebase may include around one line of code. Generated features in the protocol may be expressed as simple binary language feature names in human readable form. Retained features may have unique feature names that can be communicated and used in subsequent iterations of model development. Programming syntax may express generated features for various pipeline operations, e.g., for ordering generated features and for scaling operations.

FIG. 3 illustrates one iteration of a model generation process that typically includes multiple generations. One metric of the overall ML model development process is how many generations have been run. This metric may be subject to limits. Iterative model development may index generations of development via ordinal numbers from the first developmental generation to the final production generation.

Programming structure may support continual feature generation during iterative model development, e.g., for re-seeding feature generation during continual operation of the heuristic operational network. In an embodiment, in seeding the next iteration feature expressions are conveyed with correct ordering for performing machine learning. Feature expressions also may include derivations of hyperparameters, which may be re-applied in the next iteration. In an example, an output of LSTMs network for resampling is retained, and is communicated as a binary language expression for a succeeding iteration. In the succeeding iteration the LSTMs network may apply the binary language expression as a period for upsampling data.

In contrast to conventional iterative model development that includes a "human in the loop," the heuristic operational network of the disclosure continuously applies automated pipeline operations during iterative model development. Examples of continuous application of model permutations, data transformations, and other automated pipeline operations during iterative model development include auto-generation of new models against new data, retention of previous discoveries, and degradation (reduced priority) of previous discoveries. During iterative model development, a signal can change from one generation to the next when a new pattern is learned automatically, or even when a previous pattern is relearned. During iterative model development, one generation of model development may include data windowing, and the preceding or succeeding generation of model development may exclude data windowing. Iterative model development may generate new hyperparameters for subsequent or deeper dimensional searches in iterative search functions. The present disclosure sometimes refers to hyperparameter engineering to denote automatic generation of new hyperparameters in iterative model development, such as generating a new hyperparameter in a first model search for use in a succeeding model search.

During iterative model development, at different generations ML model development process may be run with different model phases. In an embodiment, the model development process includes two or more phases. A first, discovery phase runs test model development with a relatively comprehensive set of test ML models. The discovery phase may include multiple iterations of model development. In an embodiment, a subsequent phase, e.g., second phase, may take the solution from the discovery phase and feed it back to repeat the process with a simplified model space. In an embodiment, during multi-phase model development a subsequent phase of model development continues model development in actual conditions of use.

In an example, the discovery phase includes ANNs in the test models for discovery of the features. The subsequent phase takes the solution developed with ANNs to reseed a new, simpler test without ANNs to model the discovered features. In a practical application of multi-phase model development, the subsequent phase runs a re-activated model development algorithm to yield a final pre-trained ML model with high interpretability. A final ML model without ANNs can be much more explainable, whereas the developmental model can have more limited interpretability.

Figure 8:
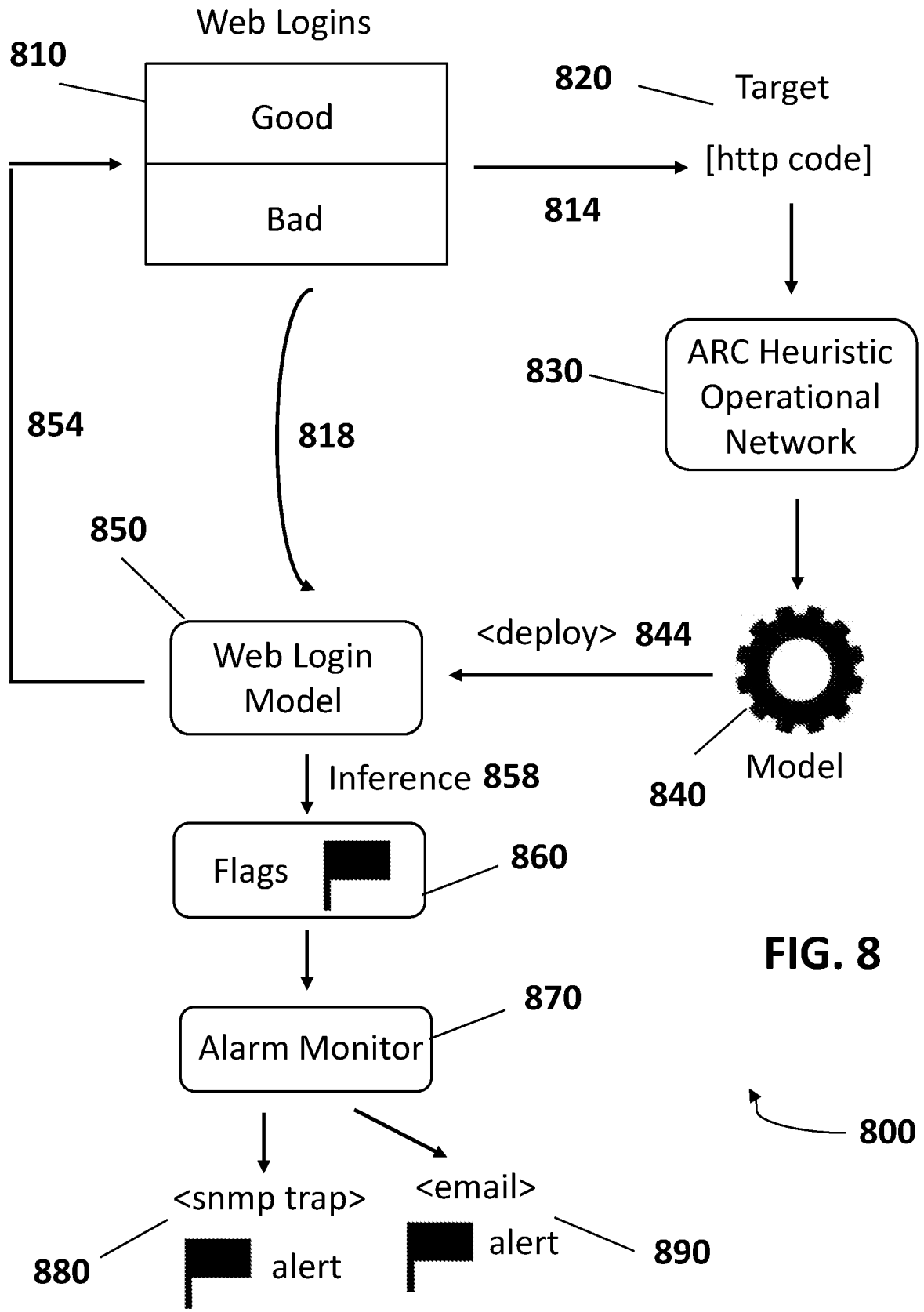
FIG. 8 shows an ML model development framework for developing a security model to discover hacked logins in a system, in accordance with an embodiment.

FIG. 8 shows an architecture of an AI development framework 800 illustrating a use case for the heuristic operational network described herein. The framework 800 is configured to develop an information security model that be used to discover hacked logins in a system. In order to protect systems from unauthorized use, network-based services often ask each user to provide a username and corresponding password before allowing access to the services. Systems that rely on single-factor authentication can be susceptible to attack by malicious entities who impersonate legitimate users. For example, passwords can sometimes be guessed or derived from information known about a legitimate user. In an embodiment, the AI development framework 800 develops an information security model that analyzes attributes of recorded logins to determine patterns or conditions that are characteristic of non-fraudulent ("good") logins or fraudulent ("bad") logins. Attributes of recorded logins may include time stamps of logins. In an example information security model, a malicious entity is attempting to hack passwords from the outside. The malicious entity seeks to avoid standard lockout, e.g., 3-time lockout. A pattern may be formed on the basis that a normal or "good" user does not know his login has failed attempts. Binary classification may seek to discern this difference between patterns of good-logins versus patterns of bad-logins.

A data set 810 of web logins, including "good" and "bad" logins, provides an abstraction and reasoning corpus for a heuristic operational network 830. Initial limited scale grid search of the data set 810 and target 820 outputs 114 an http code as input to the heuristic operational network 830. For example, the grid search may resample features such as login time stamps that may be used for time series analysis of good and bad logins.

AI development framework 800 processes "good" and "bad" logins in the input data set 810 in order to extract meaningful temporal characteristics of the data. The system may apply a time series classification (TSC) analysis to predict a target variable in the information security model. TSC may apply scaling techniques to provide insights into the spatial distribution of the input time series of "good" and "bad" logins.

In an embodiment, TSC employed a resample function to time series data in the input data set 810. This resample function generates a unique sampling distribution on the basis of the actual data. The user can select resampling parameters given a date-time column, time window or period, and related aggregation function.

In an example, AI development framework 800 applies the resample function to model development in a Long Short-Term Memory (LSTM) network. LSTM is a type of recurrent neural network capable of learning order dependence in sequence prediction problems. Here, LSTMs are applied to find a recurring pattern/signal in the data set without prior data transformation of the data using supervised learning in which date-time is a known feature. The LSTMs convey a model including batch size and sequence length for the network, in which sequence length may be a naturally occurring period or signal in the data. LSTMs may employ data windowing of time series data for normalization during resampling. In a subsequent step, the discovered sequence length from the LSTMs model is used by a gradient boosting machine network as a hyperparameter (dimensional input). LSTMs may apply hyperparameter engineering to automatically generate new hyperparameters for use in subsequent dimensional searches in resampling data. In an embodiment, the gradient model machine network employs the sequence length as a period for resampling data, and outputs a list of feature importance values.

In other pipeline operations, model test permutations may be measured for fitness, and a range of sequence lengths may be automatically searched during genetic operations. In continuous operation of the heuristic operational network during iterative generations of model development, the sequence length may be continually learned given a threshold and may be input to gradient boosting machine model search in which the resampling period is used in an automatic data transformation. Hyperparameter operation uses unsupervised learning in attempting to solve for the resampling period used by the supervised learning model in automatic data transformation. After the search is complete and the model performance threshold has been met, the model search produces the feature importance list, which includes a priority login list of "hacked" attempted logins.

The heuristic operational network 830 outputs a pretrained model 840. Model 840 may be deployed 844 to develop a production web login model 850. In support of iterative ML model development, web login model 850 may receive web login source data 818, and web login model 850 may feed model results back to web logins data set 810 to seed further generations of model test development. Web login model 850 is configured to output model inferences 858 that generate flags 860 transmitted to alarm monitor 870. Alarm monitor 870 can trigger Simple Network Management Protocol (SNMP) Trap alert messages 880 and email alerts 890.

In a use example, a hacker attempts to login to the account of an authorized user but fails sporadically to avoid a lockout. The web login model 850 identifies a pattern of these attempts at fraudulent login and can trigger alarms and alerts. In an embodiment, multi-phase model development includes continuing development of the model in actual conditions of use. In an example, during use of the web login model 850 a hacker changes his attack pattern. Web login model 850 feeds model results back to web logins data set 810 to seed iterative development by the heuristic operational network 830 of a further model generation to counteract the new attack pattern.

Figure 9:
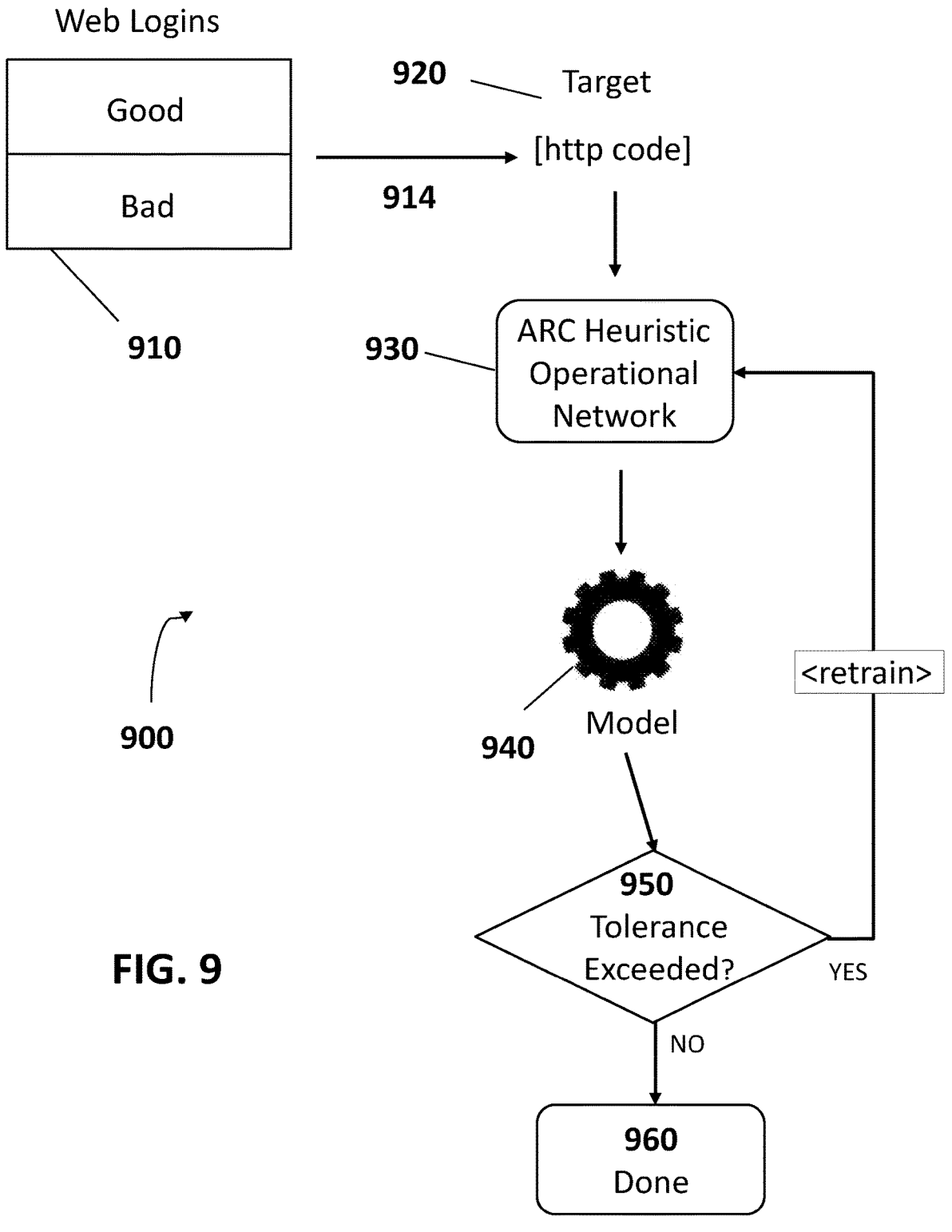
FIG. 9 shows an ML model test framework for selectively retraining a pre-trained security model to discover hacked logins in a system, in accordance with an embodiment.

FIG. 9 shows an architecture of an AI model test framework 900 that may be employed to retrain a pre-trained development model 940 to develop a security model to discover hacked logins in a system. Development model 940, output by heuristic operational network 930, is tested at 950 to determine whether a performance tolerance is exceeded. If the tolerance is not exceeded, model test framework 900 is terminated 960. If the tolerance is exceeded, the framework transmits a signal to heuristic operational network 930 to retrain the ML security model.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc," as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What I claim is:

1. A method of training a first computer model using a feature set and training technique determined by a second computer model, the method comprising:

executing, by a processor, the second computer model to identify a set of features within a training dataset where each feature within the set of features has an importance value that satisfies a threshold, the importance value corresponding to a relevance to a target value for model performance generated by the first computer model being trained using the training dataset;

calculating, by the processor, a score for each feature within the set of features by applying each feature within the set of features to a plurality of artificial intelligence model training techniques within a set of artificial intelligence model training techniques, wherein the score for each feature is associated with the feature and a corresponding artificial intelligence model training technique;

selecting, by the processor, based on the score for each feature associated with the feature and the corresponding artificial intelligence model training technique, a subset of the set of features having a fitness score corresponding to at least one artificial intelligence model training technique within the set of artificial intelligence model training techniques, the subset comprising fewer features than the set of features identified by the second computer model; and training, by the processor, the first computer model using the subset of the set of features using the at least one artificial intelligence model training technique within the set of artificial intelligence model training techniques that corresponds to the subset of the set of features, such that the training is performed based on feature combinations corresponding to a specified training technique without human-domain predispositions.

2. The method of claim 1, wherein the second computer model uses a gradient boosting protocol to perform a grid search.

3. The method of claim 1, further comprising:

generating, by the processor, a new feature corresponding to a combination of at least two features within the set of features, wherein the new feature has a fitness score that satisfies a defined threshold or the fitness threshold.

4. The method of claim 1, further comprising:

generating, by the processor, a new feature corresponding to a convolution of at least two features within the set of features, wherein the new feature has a fitness score that satisfies a defined threshold or the fitness threshold.

5. The method of claim 1, further comprising:

generating, by the processor, a new feature corresponding to a scaled transformation of at least one feature within the set of features, wherein the new feature has a fitness score that satisfies a defined threshold or the fitness threshold.

6. The method of claim 1, further comprising:

generating, by the processor, a new feature corresponding to application of a genetic operator to at least one feature derived from the set of features, wherein the genetic operator comprises one or more of crossover, mutation, and selection, wherein the new feature has a fitness score that satisfies a defined threshold or the fitness threshold.

7. The method of claim 1, wherein the set of artificial intelligence model training techniques includes at least one of a neural network model, a support vector machines model, a gradient boosted decision tree model, a long short-term memory model, or a random forest machine learning model.

8. The method of claim 1, wherein the processor applies each feature within the set of features to different model architectures for at least one artificial intelligence model training technique within the set of artificial intelligence model training techniques.

9. The method of claim 8, wherein the different model architectures correspond to one or more of different number of layers of a neural network, different ranges of neurons, different sequences, and different embedded layer sizes.

10. The method of claim 1, wherein the set of artificial intelligence model training techniques includes different hyperparameters.

11. The method of claim 10, wherein the set of artificial intelligence model training techniques comprise automatic generation of new hyperparameters in iterative model development.

12. The method of claim 1, wherein the set of artificial intelligence model training techniques includes at least two of a neural network model, a support vector machines model, a gradient boosted decision tree model, a long short-term memory model, or a random forest machine learning model, and further includes different hyperparameters for each of the at least two of the neural network model, the support vector machines model, the gradient boosted decision tree model, the long short-term memory model, or the random forest machine learning model.

13. A method comprising:

executing, by a processor, a first computer model to identify a set of features within a training dataset where each feature within the set of features has an importance value that satisfies a threshold, the importance value corresponding to a relevance to a target value for model performance generated by the first computer model being trained using the training dataset;

calculating, by the processor, a score for each feature within the set of features by applying each feature within the set of features to a plurality of artificial intelligence model training techniques within a set of artificial intelligence model training techniques, wherein the score for each feature is associated with the feature and a corresponding artificial intelligence model training technique selected from a first set of machine learning models;

selecting, by the processor, based on the score for each feature associated with the feature and the corresponding artificial intelligence model training technique, a subset of the set of features having a fitness score corresponding to at least one artificial intelligence model training technique within the set of artificial intelligence model training techniques, the subset comprising fewer features than the set of features identified by the first computer model;

training, by the processor, a second computer model using the subset of the set of features using at least one artificial intelligence model training technique within the set of artificial intelligence model training techniques selected from the first set of machine learning models that corresponds to the subset of the set of features; and training, by the processor, a third computer model using a set of features derived from the subset of the set of features having a fitness score satisfying a threshold using at least one artificial intelligence model training technique within a set of artificial intelligence model training techniques selected from a second set of machine learning models, such that the training is performed based on feature combinations corresponding to a specified training technique without human-domain predispositions.

14. The method of claim 13, wherein the second set of machine learning models comprises a subset of the first set of machine learning models.

15. The method of claim 13, wherein the first set of machine learning models comprises at least one neural network model, wherein the second set of machine learning models does not comprise a neural network model.

16. A system comprising:

an application server comprising a processor executing or hosting an automated machine learning model application, the processor configured to execute or host the automated machine learning model application to:

execute a second computer model to identify a set of features within a training dataset where each feature within the set of features has an importance value that satisfies a threshold, the importance value corresponding to a relevance to a target value for model performance generated by a first computer model being trained using the training dataset;

calculate a score for each feature within the set of features by applying each feature within the set of features to each artificial intelligence model training technique within a set of artificial intelligence model training techniques, wherein the score for each feature is associated with the feature and a corresponding artificial intelligence model training technique;

select, based on the score for each feature associated with the feature and the corresponding artificial intelligence model training technique, a subset of the set of features having a fitness score corresponding to at least one artificial intelligence model training technique within the set of artificial intelligence model training techniques, the subset comprising fewer features than the set of features identified by the second computer model; and train the first computer model using the subset of the set of features having a fitness score satisfying a threshold using at least one artificial intelligence model training technique within the set of artificial intelligence model training techniques that corresponds to the subset of the set of features, such that the training is performed based on feature combinations corresponding to a specified training technique without human-domain predispositions.

17. The system of claim 16, further comprising a first database of machine learning test models comprised in the set of artificial intelligence model training techniques and a second database of test hyperparameters comprised in the set of artificial intelligence model training techniques, wherein calculating the score for each feature within the set of features applies each feature within the set of features to a plurality of machine learning test models retrieved from the first database and to a plurality of test hyperparameters retrieved from the second database.

18. The system of claim 16, wherein the second computer model uses a gradient boosting protocol to perform a grid search.

19. The system of claim 16, wherein the processor is further configured to execute or host the automated machine learning model application to generate a new feature, wherein the new feature has a fitness score that satisfies a defined threshold or the fitness threshold, wherein the new feature comprises one or more of: combination of at least two features within the set of features; convolution of at least two features within the set of features; or a scaled transformation of at least one feature within the set of features.

20. The system of claim 16, wherein the processor is further configured to execute or host the automated machine learning model application to generate a new feature, wherein the new feature has a fitness score that satisfies a defined threshold or the fitness threshold, wherein the new feature applies a genetic operator to least one feature derived from the set of features, wherein the genetic operator comprises one or more of crossover, mutation, and selection.

21. The system of claim 16, wherein the set of artificial intelligence model training techniques includes at least one of a neural network model, a support vector machines model, a gradient boosted decision tree model, a long short-term memory model, or a random forest machine learning model.

\* \* \* \* \*